United States Patent Office

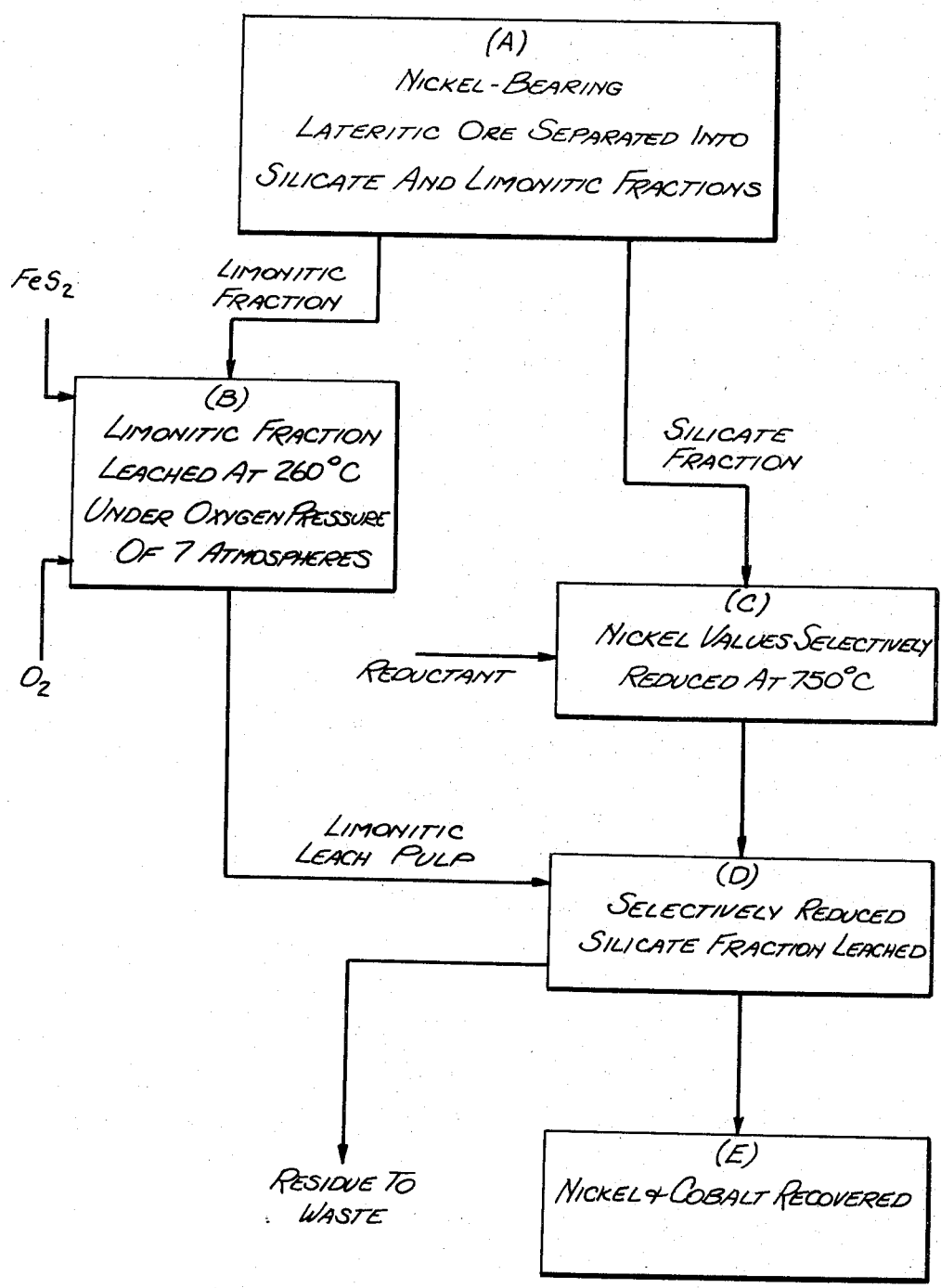

3,773,891
Patented Nov. 20, 1973

3,773,891
ACID LEACHING OF LATERITIC ORES
Charles Edward O'Neill, Port Credit, Ontario, Canada, assignor to The International Nickel Company, Inc., New York, N.Y.
Filed Dec. 10, 1971, Ser. No. 206,730
Int. Cl. C01g *51/10, 53/10*
U.S. Cl. 423—139                        36 Claims

ABSTRACT OF THE DISCLOSURE

Nickeliferous or cobaltiferous lateritic ores are separated into limonitic and silicate fractions, and the limonitic fraction is pressure leached with an aqueous sulfuric acid solution to provide a partially-loaded leach solution while the nickel or cobalt values in the silicate fraction are selectively reduced and then leached with the partially-loaded leach solution to provide a pregnant solution from which nickel or cobalt are recovered.

---

The present invention relates to the treatment of nickeliferous oxide ores, and more particularly to the hydrometallurgical recovery of nickel from nickel-containing lateritic ores.

Although deposits of nickeliferous laterites form the largest part of known nickel reserves, these deposits have not been extensively exploited on a commercial basis because of the difficulties encountered in economically treating these deposits for nickel recovery. As used herein, the terms "nickel-containing," "nickel-bearing" or "nickeliferous" lateritic ores refer to oxide, as distinguished from sulfide, mineral deposits of nickel. Moreover, although the invention will be described with emphasis on nickel it will be understood that unless specifically noted all references to nickel will be equally applicable to cobalt and cobalt-containing lateritic ores.

Nickeliferous lateritic ores are geographically found in tropic and subtropic regions where there is an abundance of rainfall and decaying vegetation which together provide acidic ground waters that are effective in weathering nickeliferous peridotite or serpentine. The acidic ground waters attack and dissolve magnesium, iron and nickel while silica is colloidally suspended in the solution. Since the ground waters are not highly acidic, a portion of the iron dissolved in the ground waters is oxidized to ferric iron and is precipitated as ferric hydroxide. As the iron-depleted ground waters percolate through the underlying soil and rock, the ground waters are partially neutralized by magnesia in the underlying rock and nickel along with further amounts of iron is precipitated as a solid solution with the iron. This process is repeated many times and a lateritic deposit comprising an upper oxidized iron oxide layer, a nickel-enriched iron oxide intermediate layer and the underlying unweathered rock is formed. Because of the nature of the weathering process there is no distinct boundary between the layers but rather a gradation of one layer into the next. The upper portions of the intermediate layer are substantially nickel enriched iron oxide (limonite) while the lower portions of the layer are a mixture of limonite and fragments of undecomposed nickeliferous silicate (saprolite). This gradation of limonite and saprolite permits separate mining and treatment of these fractions.

It has been suggested to treat nickeliferous lateritic ores pyrometallurgically to recover ferronickel or nickel matte. Although these processes are effective in recovering nickel values, large amounts of fuel must be expended in smelting the entire mass of the ore so that these processes are economically feasible only when treating lateritic ores having relatively high concentrations of nickel.

In order to minimize high fuel costs when treating lower grade lateritic ores, it has been suggested, and carried into practice, to treat lateritic ore to selectively reduce substantially all the nickel and only controlled amounts of iron and the reduced nickel values are chemically treated for nickel recovery. The reduced nickel values can be recovered by carbonyl techniques or by leaching with ammoniacal or acid solutions. These processes are technically sound, but the entire mass of the ore must be selectively reduced thereby incurring comparatively high fuel and reagent costs. Although numerous attempts have been made to avoid the foregoing problems and disadvantages, none, as far as I am aware, has been entirely satisfactory when carried into practice on a commercial scale.

It has now been discovered that nickeliferous lateritic ore that is minable or separable into limonitic and silicate fractions can be acid leached while the problems associated with fuel and reagent consumption are minimized.

An object of the present invention is to provide a process for hydrometallurgically recovering nickel from nickeliferous lateritic ores.

Another object of the present invention is to provide a process for recovering nickel from nickeliferous lateritic ores by acid leaching.

Still another object of the present invention is to provide a process for separately acid leaching the limonitic and saprolitic fractions of a nickeliferous lateritic ore to recover nickel and cobalt therefrom.

Other objects and advantages will become apparent from the following description taken in conjunction with the figure which is a flowsheet of an embodiment of the process in accordance with the present invention.

Generally speaking, the present invention contemplates an acid leaching process for recovering nickel or cobalt values from nickel- or cobalt-containing lateritic ores that have limonitic and silicate fractions. During or after mining, the lateritic ore is separated into limonitic and silicate fractions. The nickel or cobalt values are pressure leached from the limonitic fraction with an aqueous sulfuric acid solution at a temperature above 150° C. to provide a partially-loaded nickel or cobalt solution. The silicate fraction of the ore is selectively reduced to reduce a preponderant part of the nickel or cobalt values and only controlled amounts of iron. The selectively reduced silicate fraction is slurried with the partially-loaded nickel or cobalt leach solution which contains free acid at least in an amount sufficient to satisfy the stoichiometry of the reaction of the free acid with the nickel or cobalt values in the silicate fraction and this slurry is aerated to dissolve the reduced metal values to provide a pregnant leach solution from which nickel or cobalt values are readily recovered.

A particularly advantageous embodiment of the present invention is to generate the sulfuric acid solution in situ. Thus, after separating the lateritic ore into limonitic and silicate fractions, the limonitic fraction is slurried with water and at least one reagent selected from the group consisting of elemental sulfur or sulfur compounds of iron and the slurry is heated to a temperature above about 150° C. under an oxygen partial pressure of at least about 5 atmospheres to oxidize the sulfur or its compounds of iron to sulfuric acid and iron to hydrated ferric hydroxide, which sulfuric acid leaches the nickel or cobalt values from the limonitic fraction to provide a partially loaded nickel or cobalt solution. The elemental sulfur or sulfur compounds of iron are advantageously added in amounts to produce sulfuric acid at least in amounts sufficient to satisfy the stoichiometry of the reaction of sulfuric acid with the nickel or cobalt in both the limonitic and silicate fractions. Alternatively, the elemental sulfur or the sulfur compounds of iron are added to aqueous limonitic slurry in amounts to generate sufficient acid to leach the nickel and cobalt from the limonitic fraction with additional amounts of sulfuric acid or sulfuric acid-forming ingredients being added to the partially-loaded nickel or cobalt solution for leaching the selectively reduced silicate fraction. The silicate fraction, after being selectively reduced as described in greater detail hereinafter, is leached with the partially leached solution to provide a pregnant solution from which nickel and/or cobalt can be recovered.

All nickeliferous lateritic ores can be treated in accordance with the process of the present invention. However, in order to minimize the consumption of fuel and leaching reagents, it is advantageous to treat nickeliferous lateritic ores that have a minimum iron content of at least about 30% and more advantageously about 35%. Lateritic ores containing less than about 30% iron can be treated in accordance with the present invention but the decreasing availability of a separable limonitic fraction makes it more advantageous to be treated in accordance with the process described in U.S. application Ser. No. 171,759, which is assigned to the assignee of the present application. As noted hereinbefore, the ore is separated into two fractions—a silicate fraction containing less than about 30% iron and a limonitic fraction containing more than about 40% iron. The relative proportions of the silicate and limonitic fractions will be dependent upon the overall iron content of the lateritic ore. For example, the limonitic and silicate fractions will be substantially equal when the overall iron content of the lateritic ore is about 30%. Although the iron content of the silicate and limonitic fractions can vary widely, for the purposes of the present invention a fraction containing less than about 30% iron will be considered the silicate fraction while the fraction containing more than about 40% will be considered the limonitic fraction.

Referring now to the figure which is a flowsheet of an advantageous embodiment of the process in accordance with the present invention, nickel-bearing lateritic ore is separated into limonitic and silicate fractions in step A. The limonitic fraction is, in step B, directly acid leached, either with an added acidic aqueous solution (not shown in the flowsheet) or with an acidic aqueous solution that is generated in situ by the oxidation of elemental sulfur, iron pyrites, pyrrhotite, or furnace matte or by hydrolysis of iron sulfates at a temperature of 260° C. under an oxygen partial pressure of 7 atmospheres to provide a partially loaded nickel- and cobalt-containing leach solution. In step C, the nickel-bearing silicate fraction is selectively reduced at a temperature 750° C.; and, in step D, the selectively reduced silicate fraction is leached with the partially-loaded nickel- and cobalt-containing leach solution to produce a pregnant leach solution that is treated in step E for nickel and cobalt recovery.

As noted hereinbefore, the nature of the weathering process makes it possible to separately mine the limonitic and silicate fractions and in practice, it is advantageous that the limonitic and silicate fractions be separately mined. However, if the nature of the deposit renders it impractical or impossible to separately mine the silicate and limonitic fractions, these fractions can be separated by screening or other sizing operations. The limonitic fraction requires no preliminary treatment except perhaps a rough screening. The silicate fraction is advantageously crushed to a size of at least 100% minus 20 mesh Tyler Screen Size (TSS) to facilitate selective reducing and leaching operations.

Nickel is leached from the limonitic fraction by heating a slurry of limonite and an aqueous solution of sulfuric acid or ferric sulfate. The sulfuric acid can be generated in situ by adding elemental sulfur or sulfur compounds of iron to the aqueous slurry of the limonitic fraction and heating the slurry to at least 220° C. while aerating the slurry with air, oxygen-enriched air or commercial oxygen. The slurry of limonite in the acidic aqueous solution is controlled to contain between about 20% and 45% solids, by weight, and advantageously between about 30% solids and 40% solids, in order to minimize material handling problems while insuring stable slurries. Sulfuric acid, elemental sulfur or sulfur compounds of iron capable of producing sulfuric acid under leaching conditions are added to the slurry at least in amounts to provide sufficient sulfuric acid to insure good extraction of nickel and cobalt from both the limonitic and silicate fractions. More precisely, sufficient amounts of sulfuric acid, whether added as such or generated in situ, are employed to at least satisfy the stoichiometry of the reactions of sulfuric acid with the nickel and cobalt in both the limonitic and silicate fractions. Even more precisely, sulfuric acid, whether added as such or generated in situ, is provided in amounts between about 15% and 30%, advantageously between about 20% and 25%, based on the total weight of the ore being treated.

When the slurry of limonitic ore is formed with an acidic aqueous solution of sulfuric acid or ferric sulfate, the slurry is placed in an autoclave and is heated to a temperature to between about 150° C. and 300° C., and advantageously to a temperature between about 220° C. and 260° C., to leach the nickel values from the limonitic ore. At these temperatures, ferric iron displays only a very limited solubility so that nickel and cobalt values are effectively selectively leached from the limonitic fraction of the ore. Lower leaching temperatures can be employed but greater amounts of ferric iron are taken into solution with a concomitant consumption of the leaching reagent and any iron hydroxide precipitated by hydrolysis of the ferric salts is gelatinous and difficult to filter, presenting subsequent problems in liquid-solid separation. Higher temperatures can be employed but the increased selectivity of the leaching reaction is not sufficiently great to justify the additional cost of considerably heavier autoclaves.

Advantageously, leaching of the limonitic ore is accomplished by generating sulfuric acid and iron sulfate in situ by the oxidation of iron pyrites. When generating sulfuric acid and/or iron sulfate in situ by oxidation of iron pyrites, an aqueous slurry containing between about 25% and 45% limonitic ore and between about 10% and 20%, based on the weight of the ore, iron pyrites is established. This slurry is placed in an autoclave and heated to a temperature between about 150° C. and 300° C., advantageously between about 220° C. and 260° C., under an oxygen partial pressure of at least about 5 atmospheres whereby the iron pyrites are oxidized to ferric sulfate which hydrolyzes to sulfuric acid and ferric hydroxide. The sulfuric acid and ferric sulfate solution is effective in selectively leaching nickel and cobalt values from the limonitic fraction of the ore. Since sulfuric acid is not initially present in the aqueous slurry and is gradually formed by oxidation of iron pyrites, the pH value of the aqueous solution is sufficiently high through a preponderant part of the operation so that only minor amounts of magnesia and alumina are dissolved thereby minimizing the problems associated with the buildup of accretions in the autoclave due to the precipitation of magnesia and alumina compounds. Higher and lower temperatures can be employed when generating the leaching solution in situ, but when lower temperatures are employed the oxidation of sulfur or its compounds of iron and the leaching of nickel values from the limonitic ore are undesirably slow and hydrolyzed iron hydroxide precipitated at low temperatures is highly gelatinous presenting subsequent liquid-solid separation problems. When higher temperatures than those within the foregoing range are employed, the more rapid reaction rate and the more easily filterable ferric hydroxide do not wholly justify the increased cost associated with the use of heavier autoclaves. In most instances, having regard to rate of reaction, consumption of reagents, subsequent liquid-solid separation and apparatus requirements, best results are obtained by treating the slurry of limonitic ore and iron pyrites at a temperature between about 220° C. and 260° C. under an oxygen partial pressure between about 5 atmospheres and 10 atmospheres.

Whether the limonitic ore is treated with a prepared acidic or ferric sulfate solution or by a solution generated in situ, the slurry must be sufficiently agitated to maintain the solids in suspension, to provide good liquid-solid contact, and to provide good gas-solid contact when elemental sulfur is being oxidized to sulfuric acid or when sulfur compounds of iron are being oxidized to ferric sulfate to generate the leaching solution in situ. Likewise, in leaching the silicate fraction as to be described hereinafter, the slurry of the silicate fraction in the partially-loaded nickel solution must be sufficiently agitated to maintain a stable slurry, to maintain good solid-liquid contact and to provide good gas-liquid contact where it is desired to oxidize and hydrolyze iron in the leach solution. The degree of required agitation cannot be readily quantified but by observing the stability of the slurry and/or the rate of reaction it can be readily ascertained whether there is sufficient agitation.

Upon completion of leaching the limonitic fraction, usually between about 0.5 hour and 1.5 hours, a partially-loaded nickel leach solution containing up to about 10 grams per liter (g.p.l.) nickel, up to about 1 g.p.l. cobalt, up to about 5 g.p.l. iron, and free acid in amounts equivalent to between about 10% and 15% of the weight of the silicate fraction is obtained. The partially-loaded nickel leach solution can then be separated from the leached ore by well-known means, such as filtration, for subsequent use in leaching the selectively reduced silicate fraction of the ore. Alternatively, the selectively-reduced silicate fraction of the ore can be added directly to the slurry of the partially-loaded nickel leach solution without any intervening solid-liquid separation.

Advantageously, the selectively reduced silicate fraction is slurried with some of the limonite leach pulp in the partially-loaded nickel leach solution to form a slurry containing between about 15% and 25% solids by weight. This slurry is maintained at a temperature between about 35° C. and 95° C., advantageously between about 40° C. and 60° C., and aerated with a free-oxygen-containing gas, such as air, oxygen-enriched air or commercial oxygen, to oxidize any ferrous iron in solution to the ferric state in which state ferric iron is effective in dissolving additional amounts of selectively reduced nickel, cobalt and iron.

Leaching of the selectively reduced silicate fraction with the partially-loaded nickel leach solution obtained from the direct leaching of the limonitic fraction of the ore is an important feature of the present invention. Metallic nickel in the selectively reduced silicate phase is rapidly dissolved by the partially-loaded nickel leach solution from the first-stage leaching operation, and the selectively reduced silicate fraction of the ore is effective in partially neutralizing the partially-loaded nickel leach solution so that subsequent nickel recovery operations from this solution are greatly facilitated without the use of excessive amounts of extraneously added neutralizing reagents. Thus, the free acid content of the leach solution in the first-stage leaching operation is more fully utilized during the second-stage leaching operation and is not merely neutralized by the addition of extraneous neutralizing reagent. Additionally, by reacting the partially-loaded nickel leach solution from the first reaction with the selectively-reduced silicate fraction most of the ferric iron in the leach solution is reduced to the ferrous state during the second-stage leaching operation so that when nickel is recovered by precipitation processes, such as bulk precipitation with hydrogen sulfide, undue amounts of precipitating reagents are not consumed in merely reducing ferric iron to ferrous iron. Also, by selectively reducing the silicate fraction the magnesia in the silicate fraction is rendered less reactive and thus smaller amounts of leaching reagents are consumed in dissolving magnesia and the problems associated with scale formation are likewise minimized. Selective reduction of the silicate fraction particularly at the temperatures disclosed herein, has the additional advantage of providing a leach residue that is readily separated from the pregnant solution by conventional techniques.

Selective reduction of the silicate fraction is advantageously conducted in a countercurrently-fired rotating furnace, although selective reduction can be accomplished in other well-known apparatus that provide good solid-gas contact such as fluid bed reactors or multi-hearth furnaces in which rotating rabbles transfer the ore from hearth to hearth. In order to obtain all the benefits associated with selective reduction of the silicate fraction, the silicate fraction ground to a screen size of about 100% minus 20 mesh to provide good gas-solid contact is heated to a temperature between about 650° C. and 825° C. in an atmosphere having a reducing potential equivalent to a $CO:CO_2$ ratio of between about 1:4 and 1:1 and advantageously between about 1:3 and 2:3. Rather than employing a gaseous atmosphere for controlling the selective reduction operation, controlled amounts of solid or liquid reductants can be added to the finely-divided ore in amounts to insure that substantially all the nickel values and only controlled amounts of iron are reduced but this procedure is not the most advantageous since, particularly with solid reductants, the rate of reaction is measurably slower at the temperatures employed than when selectively reducing atmospheres are used. The selective reduction operation is conducted in such a manner as to reduce substantially all the nickel values and not more than about 4 parts of iron for each part of nickel and most advantageously not more than about 2 parts of iron for each part of nickel. The selectively-reduced ore is then cooled without reoxidation for subsequent leaching by the partially-loaded nickel leach solution derived from the direct leaching of limonite in the first-stage leaching operation. Alternatively, the selectively-reduced silicate fraction can be quenched in the partially-loaded nickel leach pulp derived from the first-stage leaching operation.

An advantageous embodiment of the present invention is to incorporate small but effective amounts of sulfur in the silicate fraction to catalyze selective reduction and subsequent leaching of the metallized values. Selective reduction is catalyzed by adding sulfur-bearing materials to the ore prior to or during reduction. Sulfur incorporated in the ore during selective reduction is also effective in improving the leaching reactions but improved leaching can also be realized by treating the selectively reduced ore with a gaseous sulfur-containing material, such as hydrogen sulfide. The effectiveness of sulfur in catalyzing reduction and in improving leaching results is only realized if the sulfur is uniformly distributed throughout the metallized values. Sulfur can be incorporated in the silicate fraction by adding elemental sulfur, iron pyrites, pyrrhotite, sulfur dioxide or hydrogen sulfide to the ore. Catalyzation of selective reduction and activation of the metallized values for leaching are best obtained by incorporating the sulfur-bearing material in the ore in amounts to provide the ore with a sulfur content, by weight, of up to about 2% and advantageously between about 0.1% and 2%, e.g., between about 0.2% and 1%.

When substantially all the selectively-reduced nickel values in the silicate fraction of the ore are leached with the partially-loaded nickel leach solution to provide a pregnant solution, the leached residue is separated from the pregnant solution by well-known liquid-solid separation techniques. The pregnant leach pulp, which contains between about 5 g.p.l. and 10 g.p.l. nickel, up to about 1 g.p.l. cobalt, between about 5 g.p.l. and 10 g.p.l. iron and having a pH value of more than about 1, can be treated to recover nickel and cobalt values. For example, the pregnant solution can be treated with superatmospheric partial pressures of hydrogen sulfide to precipitate the sulfides of cobalt and nickel in bulk from which nickel and cobalt can be separately recovered. Advantageously, the pregnant solution can be treated by liquid-solid separation techniques to first remove cobalt therefrom and then the raffinate can be treated for nickel recovery. For example, a pregnant solution can be treated with a water-insoluble quaternary ammonium thiocyanate or a tertiary, secondary or primary thiocyanate salt in an organic solvent to selectively remove cobalt from the pregnant solution and to provide an aqueous raffinate substantially devoid of thiocyanate anions and containing substantially all the nickel values in the pregnant leach solution. After effecting the liquid-solid separation, cobalt can be recovered from the organic phase and nickel can be recovered from the aqueous raffinate by well-known techniques such as hydrogen sulfide precipitation or by precipitation as a hydroxide or carbonate by the addition of a base or soda ash.

In order to give those skilled in the art a better appreciation of the advantages of the present invention the following example is given:

EXAMPLE I

A nickeliferous lateritic ore having an overall nickel content of 1.85% and an overall iron content of 39% was separated into limonitic and silicate fractions. The separation yielded two parts of limonite for each part of silicate with the limonitic fraction containing 1.47% nickel and 48.2% iron and the silicate fraction containing 2.62% nickel and 20.7% iron.

The limonitic fraction and iron pyrites in an amount of 20 weight percent of the limonitic fraction were slurried with water to 30% solids by weight. In an autoclave under an oxygen particle pressure of about 7 atmospheres, the slurry was heated to 250° C. for 1.5 hours and was mechanically agitated to provide good gas-liquid-solid contact to oxidize the pyrites to sulfuric acid and to hydrolyze ferric sulfate. The sulfuric acid was effective in leaching 97% of the nickel from the limonitic fraction.

The silicate fraction was selectively reduced at 800° C. in an atmosphere having a carbon monoxide to carbon dioxide ratio of 2:3 to reduce substantially all the nickel values to metallic nickel and only controlled amounts of iron to metallic iron. The selectively reduced silicate fraction was slurried with cooled limonitic leach pulp to provide a slurry of 30% solids, and the resulting slurry at 80° C. was aerated with air to dissolve the reduced metal values and to oxidize and hydrolyze dissolved iron values. This treatment extracted 80.5% of the nickel from the selectively reduced silicate fraction.

Overall, 89.2% of the total nickel was extracted while employing pyrites in an amount equivalent to only 13.3% of the total weight of the ore.

The significant advantages gained by separating the limonitic and silicate fractions and selectively reducing the silicate fraction before leaching nickel values therefrom with the leach pulp of the limonitic fractions are best illustrated by way of comparison. Two parts of the limonitic fractions described in Example I were leached under identical conditions, except that iron pyrites were added only in amounts of 12.5%, based on the weight of the ore. Under these conditions, 95% of the nickel was extracted. The silicate fraction without any prior treatment was slurried with water and 45% iron pyrites (more pyrites were required to allow for the dissolution of magnesia) to 30% solids by weight. This slurry was placed in an autoclave under an oxygen partial pressure of 7 atmospheres and heated to 250° C. for 1.5 hours to oxidize the pyrites to sulfuric acid which extracted 92% of the nickel and material amounts of magnesia from the silicate fraction. The total iron pyrite addition in both leaching operations amounted to 23% based on the total amount of ore treated. This amount of iron pyrites is nearly twice the amount employed in the practice of the process in accordance with the present invention as described in Example I. Not only does the present invention permit the use of smaller amounts of iron pyrites, sulfuric acid or other sulfur compounds of iron, but the combination of steps is such that the consumption of reagents employed in recovering nickel from the pregnant solution is also significantly reduced.

Although the present invention has been described in conjunction with preferred embodiments, it is to be understood that modifications and variations may be restored to without departing from the spirit and scope of the invention, as those skilled in the art will readily understand. Such modifications and variations are considered to be within the purview and scope of the invention and appended claims.

I claim:

1. A process for acid leaching nickel- or cobalt-containing lateritic ores that have limonitic and silicate fractions which comprises: separating the ore into limonitic and silicate fractions; pressure leaching the nickel or cobalt values from the limonitic fraction with an aqueous sulfuric acid solution at a temperature above about 150° C. to provide a partially loaded nickel or cobalt solution; selectively reducing the silicate fraction to reduce a preponderant part of the nickel or cobalt values and only controlled amounts of iron; slurrying the selectively reduced silicate fraction with the partially loaded nickel or cobalt leach solution which contains free acid in an amount at least sufficient to satisfy the stoichiometry of the reaction of the free acid with the nickel or cobalt values in the silicate fraction; aerating the slurry of the partially loaded nickel or cobalt leach solution and the selectively reduced silicate fraction to dissolve the reduced metal values to provide a pregnant leach solution; and recovering nickel or cobalt values from the pregnant leach solution.

2. A process for recovering nickel or cobalt from nickeliferous or cobaltiferous lateritic ores which comprises: separating the lateritic ore into limonitic and silicate fractions; slurrying the limonitic fraction with water and at least one reagent selected from the group consisting of elemental sulfur and sulfur compounds of iron, the reagent being incorporated in the slurry in amounts to produce sulfuric acid at least in amounts sufficient to leach the nickel or cobalt from the limonitic fraction; heating the slurry to a temperature above about 150° C. under an oxygen partial pressure of at least 5 atmospheres to oxidize the reagent to sulfuric acid and iron to hydrated ferric hydroxide which sulfuric acid leaches the nickel or cobalt values from the limonitic fraction to provide a partially loaded nickel or cobalt solution; selectively reducing the silicate fraction to reduce a preponderant part of the nickel or cobalt and only controlled amounts of iron; slurrying the selectively reduced silicate fraction with the partially loaded nickel or cobalt solution which contains free acid at least in an amount sufficient to satisfy the stoichiometry of the reaction of free acid with the nickel or cobalt in the silicate fraction; aerating the slurry of the partially loaded nickel or cobalt solution and the selectively reduced silicate fraction to dissolve the reduced metal values and to oxidize and hydrolyze dissolved iron values to provide a pregnant nickel or cobalt solution; and recovering nickel or cobalt from the pregnant solution.

3. A process for recovering nickel from nickeliferous lateritic ores which comprises: separating the lateritic ore into limonitic and silicate fractions; pressure leaching the limonitic fraction with an aqueous sulfuric acid at a temperature between about 150° C. and 300° C. to provide a limonitic leach pulp of the leached limonitic fraction and a nickel-containing acidic solution containing free acid in an amount at least sufficient to satisfy the stoichiometry of the reaction of free acid with the nickel in the silicate fraction; selectively reducing the silicate fraction to reduce a preponderant part of the nickel and cobalt values and only controlled amounts of iron; leaching the selectively reduced silicate fraction with the nickel-containing acid solution and aeration to provide a pregnant leach solution; and recovering nickel and cobalt from the pregnant solution.

4. The process as described in claim 3 wherein the aqueous sulfuric acid solution contains sulfuric acid in an amount between about 15% and 30%, based on the total weight of both the limonitic and silicate fractions.

5. The process as described in claim 3 wherein the aqueous sulfuric acid solution contains sulfuric acid in an amount between about 20% and 25%, based on the total weight of both the limonitic and silicate fractions.

6. A process for recovering nickel or cobalt from nickeliferous or cobaltiferous lateritic ores, which comprises: separating the lateritic ore into limonitic and silicate fractions; forming an aqueous slurry of the limonitic fraction and at least one reagent selected from the group consisting of elemental sulfur and sulfur compounds of iron, the reagent being added to the slurry in amounts sufficient to generate sulfuric acid in an amount at least sufficient to satisfy the stoichiometry of the reaction of sulfur acid with the nickel in both the limonitic and silicate fractions; heating the slurry of the limonitic fraction and the reagent to a temperature between about 150° C. and 300° C. under an oxygen partial pressure of at least about 5 atmospheres while agitating the slurry to produce an acidic sulfate leach solution which selectively dissolves the nickel and cobalt values in the limonitic fraction to thereby form a limonitic leach pulp of the leached limonitic fraction and a partially loaded nickel and cobalt leach solution; selectively reducing the silicate fraction of the lateritic ore to reduce a preponderant part of the nickel and cobalt values and only controlled amounts of iron; leaching the selectively reduced silicate fraction with the partially loaded nickel and cobalt leach solution and with aeration to provide a pregnant leach and recovering nickel and cobalt from the pregnant solution.

7. The process as described in claim 6 wherein the sulfur compound of iron is pyrrhotite.

8. The process as described in claim 6 wherein the sulfur compound of iron is iron pyrites.

9. The process as described in claim 6 wherein the sulfur compound of iron is furnace matte.

10. The process as described in claim 6 wherein the sulfur compound of iron is ferrous sulfate.

11. The process as described in claim 6 wherein the sulfur compound is added in sufficient amounts to generate sulfuric acid in an amount between about 15% and 30%, based on the total weight of both the limonitic and silicate fractions.

12. The process as described in claim 6 wherein the sulfur compound is added in sufficient amounts to generate sulfuric acid in an amount between about 20% and 25%, based on the total weight of both the limonitic and silicate fractions.

13. The process as described in claim 6 wherein the limonitic fraction is leached at a temperature between about 220° C. and 260° C.

14. The process as described in claim 6 wherein the selectively reduced silicate fraction is leached with the limonitic leach pulp.

15. The process as described in claim 6 wherein the selectively reduced silicate fraction is leached at a temperature between about 35° C. and 95° C.

16. The process as described in claim 6 wherein the selectively reduced silicate fraction is leached at a temperature between about 40° C. and 60° C.

17. The process as described in claim 6 wherein the silicate fraction is selectively reduced at a temperature between 650° C. and 825° C.

18. The process as described in claim 6 wherein the silicate fraction is reduced at a temperature between about 650° C. and 825° C. in an atmosphere having a reducing potential equivalent to a carbon monoxide to carbon dioxide ratio between about 1:4 and 1:1.

19. The process as described in claim 6 wherein the silicate fraction is reduced at a temperature between about 650° C. and 825° C. in an atmosphere having a reducing potential equivalent to a carbon monoxide to carbon dioxide ratio between about 1:3 and 2:3.

20. A process for recovering nickel from nickeliferous lateritic ores that have an overall iron content of at least about 30%, which comprises: separating the lateritic ore into a limonitic fraction that contains above about 40% iron and a silicate fraction that contains less than about 30% iron; pressure leaching the limonitic fraction with an aqueous sulfuric acid solution at a temperature between about 150° C. and 300° C. to provide a limonitic leach pulp of the leached limonitic fraction and a partially loaded nickel leach solution containing free acid in an amount at least sufficient to satisfy the stoichiometry of the reaction of the free acid with the nickel in the silicate fraction; selectively reducing the silicate fraction at a temperature between about 650° C. and 825° C. in an atmosphere having a reducing potential equivalent to a $CO:CO_2$ ratio between about 1:4 and 1:1 to reduce a preponderant part of the nickel and cobalt values and only controlled amounts of iron; leaching the selectively reduced silicate fraction with the partially loaded nickel leach solution and aeration to provide a pregnant leach solution and recovering nickel from the pregnant solution.

21. The process as described in claim 20 wherein the aqueous sulfuric acid solution contains sulfuric acid in an amount between about 15% and 30%, based on the total weight of both the limonitic and silicate fractions.

22. The process as described in claim 20 wherein the aqueous sulfuric acid solution contains sulfuric acid in an amount between about 20% and 25%, based on the total weight of both the limonitic and silicate fractions.

23. The process as described in claim 22 wherein the selectively reduced silicate fraction is leached with the limonitic leach pulp.

24. A process for recovering nickel from nickeliferous lateritic ores that have an overall iron content of at least about 30%, which comprises: separating the lateritic ore into a limonitic fraction that contains at least about 40% iron and a silicate fraction that contains less than about 30% iron; forming an aqueous slurry of the limonitic fraction and at least one reagent selected from the group consisting of elemental sulfur and sulfur compounds of iron, the reagent being added to the slurry in amounts sufficient to generate sulfuric acid in an amount at least sufficient to satisfy the stoichiometry of the reaction of sulfuric acid with the nickel in both the limonitic and silicate fractions; heating the slurry to a temperature between about 150° C. and 300° C. under an oxygen partial pressure of at least about 5 atmospheres while agitating the slurry to produce an acidic sulfate leach solution which selectively dissolves the nickel values in the limonitic fraction forming a limonitic leach pulp of the leached limonitic fraction and a partially loaded nickel leach solution; selectively reducing the silicate fraction at a temperature between about 650° C. and 825° C. in a reducing atmosphere having a reducing potential equivalent to a $CO:CO_2$ ratio between about 1:4 and 1:1 to reduce a preponderant part of the nickel and only controlled amounts of iron; leaching the selectively reduced silicate fraction with the partially loaded nickel leach solution and aeration to provide a pregnant leach solution; and recovering nickel from the pregnant solution.

25. The process as described in claim 24 wherein the sulfur compound of iron is pyrrhotite.

26. The process as described in claim 24 wherein the sulfur compound of iron is furnace matte.

27. The process as described in claim 24 wherein the sulfur compound of iron is ferrous sulfate.

28. The process as described in claim 24 wherein the sulfur compound is iron pyrites.

29. The process as described in claim 24 wherein the reagent is added in sufficient amounts to generate sulfuric acid in an amount between about 15% and 30%, based on the total weight of both the limonitic and silicate fractions.

30. The process as described in claim 24 wherein the silicate fraction is leached with the limonitic leach pulp.

31. The process as described in claim 24 wherein solids are separated from the pregnant solution; the pregnant solution is contacted with at least one water-insoluble compound selected from the group consisting of quaternary ammonium thiocyanate and hydrothiocyanate salts of tertiary, secondary or primary amines dissolved in an organic solvent to selectively remove cobalt from the pregnant solution and to provide an aqueous raffinate substantially devoid of thiocyanate anions and nickel is recovered from the aqueous raffinate.

32. The process described in claim 24 wherein a sulfur-bearing material is added to the silicate fraction prior to the selective reduction treatment in small but effective amounts to catalyze reduction and to produce an active reduced metal product for leaching.

33. The process as described in claim 24 wherein a sulfur-bearing material is added to the silicate fraction during selective reduction in small but effective amounts to catalyze reduction and to produce an active reduced metal product for leaching.

34. The process as described in claim 24 wherein a sulfur-bearing material is added to the silicate fraction prior to selective reduction in an amount between about 0.2% and 0.1% by weight of the silicate fraction to catalyze reduction and to produce an active reduced metal product or leaching.

35. The process described in claim 24 wherein at least one sulfur-bearing material selected from the group consisting of elemental sulfur, iron pyrites, pyrrhotite, sulfur dioxide or hydrogen sulfide is added to the silicate fraction prior to or during the selective reduction treatment in an amount to provide the silicate fraction with a sulfur content between about 0.1% and 2%.

36. The process described in claim 24 wherein at least one sulfur-bearing material selected from the group consisting of elemental sulfur, iron pyrites, pyrrhotite, sulfur dioxide or hydrogen sulfide is added to the silicate fraction prior to or during the selective reduction treatment in an amount to provide the silicate fraction with a sulfur content between about 0.2% and 1%.

References Cited
UNITED STATES PATENTS

| | | | |
|---|---|---|---|
| 3,146,091 | 8/1964 | Green | 75—119 X |
| 3,367,740 | 2/1958 | Zubryckyj et al. | 75—119 X |
| 1,346,175 | 7/1920 | Caron | 423—150 |
| 2,998,311 | 8/1961 | Ills et al. | 75—119 X |
| 3,318,689 | 5/1967 | Zubryckyj et al. | 75—119 |
| 3,100,700 | 8/1963 | Hills | 75—119 X |
| 3,661,564 | 5/1972 | Gandon et al. | 75—101 R |

HERBERT T. CARTER, Primary Examiner

U.S. Cl. X.R.

75—115, 119; 423—150